Nov. 22, 1966  E. J. JUSTUS  3,286,325
SUPPORT AND DRIVE FOR CONTROLLED CROWN ROLL
Filed May 21, 1965  2 Sheets-Sheet 1
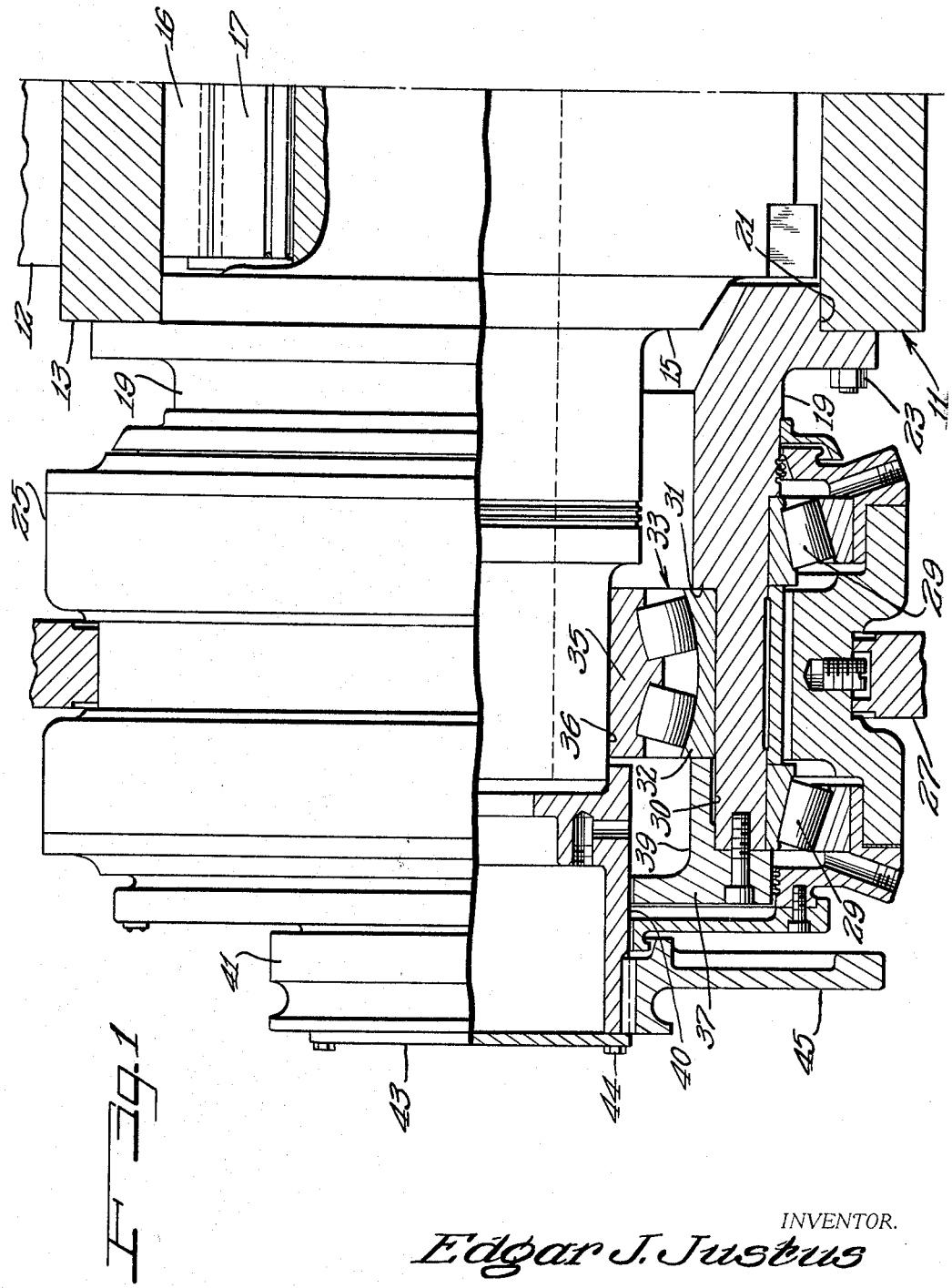
INVENTOR.
Edgar J. Justus
Hill, Sherman, Meroni, Gross & Simpson
ATTORNEYS

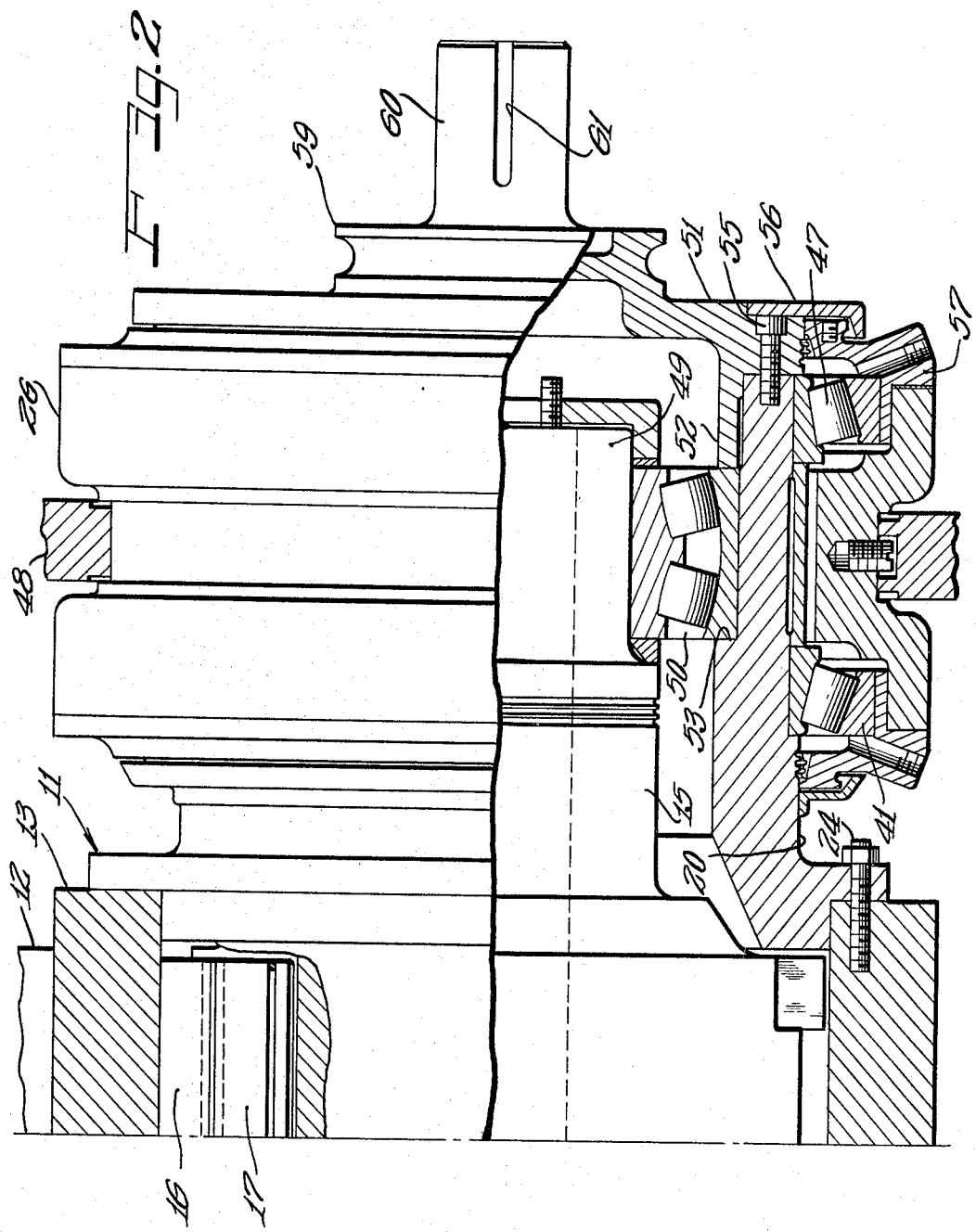

United States Patent Office 3,286,325
Patented Nov. 22, 1966

3,286,325
SUPPORT AND DRIVE FOR CONTROLLED CROWN ROLL
Edgar J. Justus, Beloit, Wis., assignor to Beloit Corporation, Beloit, Wis., a corporation of Wisconsin
Filed May 21, 1965, Ser. No. 457,753
6 Claims. (Cl. 29—116)

This application is a continuation-in-part of an application Serial No. 339,998, filed January 24, 1964, and entitled, "Adjustable Crown Roll."

The present invention relates to improvements in controlled crown rolls, in which a controlled nip pressure is obtained between a roll couple and more particularly relates to an improved drive to the roll and support for the stationary center shaft within the roll.

A principal object of the present invention is to provide a deflection compensating support for the stationary center shaft extending within and along a crown roll, arranged with a view towards utmost simplicity in construction and the elimination of binding between the shaft and roll, caused by deflection of the shaft by the nip correcting loads thereon.

A further object of the invention is to provide an improved support for the stationary center shaft of a nip correcting crown roll compensating for deflection of the shaft by the nip correcting pressures on the roll.

Another object of the invention is to provide a simple and improved support and drive for a controlled crown roll.

Still another object of the invention is to provide an improved form of controlled crown roll having a stationary center shaft, forming a reaction member for the nip correcting pressures on the roll, in which bending of the shaft by the nip correcting pressures on the roll is compensated for by supporting and journalling the roll at its opposite ends and by supporting the center shaft within the roll in the region of the bearing supports for the roll on self aligning bearings.

These and other objects of the invention will appear from time to time as the following specification proceeds and with reference to the accompanying drawings wherein:

FIGURE 1 is a view in side elevation of one end portion of a controlled crown roll constructed in accordance with the principles of the present invention, with certain parts in longitudinal section; and FIGURE 2 is a side elevational view similar to FIGURE 1, but showing the opposite end of the roll and its support, from FIGURE 1.

In the embodiment of the invention illustrated in the drawings, I have shown a controlled crown roll assembly 11, which operates in a roll couple with a second roll 12, as in my application Serial No. 339,998 of which this application is a continuation in part and, therefore, only partially shown herein for the purposes of illustrating the principles of the invention.

The roll assembly 11 includes an elongated hollow cylindrical roll shell 13 having an inner stationary core or center shaft 15 extending therethrough. The center shaft 15 has a pressure shoe 16 radially extensible from the periphery thereof for slidable engagement with the inner surface of the roll shell 13. The pressure shoe 16 may be rockably mounted on a rectangular piston 17 recessed within the center shaft and extending for substantially the length thereof as in my parent application Serial No. 339,998. The pressure shoe 16, the piston 17, the mounting of the piston in the center shaft 13 for extensible movement with respect thereto, and the fluid pressure means for applying fluid under pressure to the piston to extend the piston with respect to the periphery of the roll shell are clearly shown and described in my application Serial No. 339,998 and form no part of the present invention, except insofar as they apply a bending reaction to the center shaft 13, so need not herein be shown or described further.

The roll shell 13 is shown as having flanged sleeves 19 and 20 extending from its respective opposite ends and secured thereto.

The flange of the flanged sleeve 19 has a shouldered recess 21 formed therein and extending thereabout and receiving one end portion of said roll shell. Studs and nuts 23 are provided to secure said flanged sleeve to the end of said roll shell.

The opposite flanged sleeve 20 is similar in construction to the flanged sleeve 19 and has the opposite end of the roll sleeve 19 partially recessed therein and secured thereto as by studs and nuts 24. The flanged sleeves 19 and 20 are each journalled in bearing supports 25 and 26, respectively. The bearing support 25 is supported intermediate its ends in a saddle 27 in a suitable manner and forms a support and housing for a pair of tapered roller bearings 29, 29 at opposite sides thereof, forming bearing supports for the sleeve 19.

The sleeve 19 has a reduced diameter inner peripheral portion 30 terminating in a radially extending shoulder 31 abutted by an outer race 32 of a spherical self-aligning bearing 33, herein shown as being a roller bearing. The bearing, however, may be of any conventional form as long as it allows for angular deflection of the ends of the center shaft 15 caused by nip correcting pressures thereon, and exerting deflecting pressures on said shaft in the region of its transverse center. The self aligning bearing 33 has an inner race 35 on a reduced end portion 36 of the center shaft 15. The outer end of the sleeve 19 has an annular end plate 37 suitably secured thereto and having a cylindrical wall portion 39 extending inwardly along the inner peripheral wall of said sleeve and abutting the end of the race 32, for holding said race in position.

A cylindrical retainer 40 extends partially along and outwardly of the reduced end 36 of the center shaft 15 and is suitably secured thereto. The cylindrical retainer 40 extends outwardly of the end cap 37 and has a collar 41 extending thereabout and shown as being keyed thereto. An end plate 43 secured to the end of the retainer 40, as by cap or machine screws 44 is provided to close the end of the retainer 40 and secure the collar 41 thereto. A torque arm 45 is shown in FIGURE 1 as being formed integrally with the collar 41 and as extending radially downwardly therefrom. The torque arm 45 is provided to hold the center shaft 15 from rotation and to vary the position of said center shaft with respect to the nip of the second roll 12 to center the shoe 16 with the nip between the second roll 12 and the roll shell 13, in a conventional manner.

The flared sleeve 20 supporting the opposite end of the roll shell 13 from the flanged sleeve 19 extends outwardly of the end of said roll shell and is journalled in the bearing support 26 on spaced tapered roller bearings 47. The bearing support 26 is in turn supported in a saddle 48 similar to the saddle 27, supporting the bearing support 25. A reduced end 49 of the center shaft 15 is journalled within the sleeve 20 on a self aligning spherical roller bearing 50 in the same manner the reduced end 36 of the center shaft 15 is journalled in the spherical roller bearing 33. An end plate 51 is provided for the outer end of the sleeve 20 and has an inner cylindrical wall portion 52 extending inwardly of said sleeve, to retain the self aligning bearing 50 in place against a shouldered portion 53 of said sleeve. The end plate 51 is secured to the end of the sleeve 20 as by machine screws 55 covered by a cover plate 56 extending partially over an outer retainer 57 for the bearing 47. The end plate 51 has a central hub portion 59 extending outwardly therefrom.

The central hub portion 59 has a stub shaft 60 extending therefrom and forming a drive member for the end plate 51, sleeve 20 and roll shell 13. The shaft 60 is shown as having a keyway 61 extending therealong enabling said shaft to be driven from a conventional drive coupling or other conventional driving device.

It may be seen from the foregoing that an improved drive and support has been provided for a controlled crown roll, enabling the roll to be driven in a conventional manner and supporting the stationary center shaft within the roll adjacent its opposite ends on spherical bearings, to accommodate bending of the shaft by the crown controlling loads thereon acting in effect on the transverse center of the shaft and counteracting the crown controlling loads, and that the support avoids binding between the shaft and roll shell and materially reduces friction in the roll and enables a more accurate control of the nip pressures to be attained.

While I have herein shown and described one form in which the invention may be embodied, it may readily be understood that various variations and modifications in the invention may be attained without departing from the spirit and scope of the novel concepts thereof.

I claim as my invention:

1. In a crown roll and in combination with a second roll forming a pressure nip therewith,
    a cylindrical roll shell,
    a separate sleeve secured to and extending axially outwardly of each end of said shell,
    first bearing means extending about said sleeves and rotatably supporting said sleeves and roll shell,
    a center shaft extending along the interior of said roll shell and beyond opposite ends thereof and having fluid pressure movable means adapted to apply nip correcting pressure to the inside of said roll shell,
    drive means having driving connection with one of said sleeves for rotatably driving said shell about said center shaft,
    and spherical self-aligning bearing means supporting said center shaft in said sleeves and disposed directly inside of said first bearing means and compensating for bending of said center shaft by the nip correcting pressures on said shell.

2. In a crown roll and in combination with a second roll forming a pressure nip therewith,
    a cylindrical roll shell,
    a separate sleeve secured to and extending outwardly of each end of said shell,
    first bearing means rotatably supporting said sleeves and shell,
    a center shaft extending along said shell and beyond opposite ends thereof and having fluid pressure movable means adapted to apply nip correcting pressure to the inside of said roll shell,
    spherical self-aligning bearing means disposed directly inside said first bearing means and supporting said center shaft in said sleeves and accommodating bending of said center shaft about its bearings, caused by the nip correcting pressures on said shell,
    end plates closing the outer ends of said sleeves,
    said center shaft extending through one of said end plates and having means thereon holding said center shaft from rotation,
    and a drive shaft extending outwardly of the opposite of said end plates and forming a drive means for rotatably driving said roll shell about said center shaft.

3. A controlled crown roll assembly forming a pressure nip with the second roll comprising:
    a cylindrical roll shell,
    a non-rotatable center shaft extending along the interior of said roll shell and beyond opposite ends thereof,
    fluid pressure movable means on said center shaft adapted to apply nip correcting pressure to the inside of said roll shell,
    support sleeves extending axially beyond opposite ends of said roll shell, coaxial therewith and second thereto,
    axially spaced bearings rotatably supporting each of said sleeves and said roll shell for rotation about a horizontal axis,
    and spherical self-aligning bearings disposed within the axial limits of said axially spaced bearings, journalling said sleeves on said center shaft, adjacent opposite ends of said center shaft and spacing said roll shell from said center shaft and accommodating deflection of said center shaft caused by the nip correcting loads between said center shaft and roll shell.

4. A controlled crown roll in accordance with claim 3, wherein drive means are provided for one of said sleeves for rotatably driving said roll shell about said center shaft.

5. A controlled crown roll in accordance with claim 3, wherein end plates are secured to the outer ends of said sleeves,
    and wherein a drive shaft extends outwardly of one end plate coaxial with the axis of rotation of said sleeve and shell and forms a drive member for said sleeve and roll shell.

6. A controlled crown roll assembly in accordance with claim 3,
    wherein end plates are secured to the ends of said sleeves,
    wherein a drive shaft extends outwardly of one of said end plates coaxial of the axis of rotation of said roll shell and forms a drive member for said roll shell,
    and wherein said center shaft extends outwardly of the other of said end plates and has a torque arm secured thereto and extending radially of said shaft, for holding said shaft from rotation and maintaining said crown controlling means in centered relation with respect to the nip between said roll and the second roll exerting nip pressure thereon.

References Cited by the Examiner

UNITED STATES PATENTS

| | | | |
|---|---|---|---|
| 1,868,860 | 7/1932 | Von Reis. | |
| 2,676,387 | 4/1954 | McArn | 29—116 X |
| 3,037,557 | 6/1962 | Faeber et al. | 162—370 |
| 3,097,590 | 7/1963 | Justus | 29—116 X |
| 3,106,153 | 10/1963 | Westbrook | 29—116 X |
| 3,131,625 | 5/1964 | Kusters et al. | 100—170 |

FOREIGN PATENTS 893,426  4/1962  Great Britain.

LOUIS O. MAASSEL, *Primary Examiner.*